United States Patent
Lee et al.

[11] Patent Number: 6,148,099
[45] Date of Patent: Nov. 14, 2000

[54] METHOD AND APPARATUS FOR INCREMENTAL CONCURRENT LEARNING IN AUTOMATIC SEMICONDUCTOR WAFER AND LIQUID CRYSTAL DISPLAY DEFECT CLASSIFICATION

[75] Inventors: Shih-Jong J. Lee, Bellevue; Chih-Chau L. Kuan, Redmond, both of Wash.

[73] Assignee: Neopath, Inc., Redmond, Wash.

[21] Appl. No.: 08/888,119

[22] Filed: Jul. 3, 1997

[51] Int. Cl.$^7$ .............................. G06K 9/00; G06K 9/62
[52] U.S. Cl. ..................... 382/149; 382/145; 382/147; 382/155
[58] Field of Search ..................... 382/141–150, 382/155–159, 199, 255; 356/372, 325, 401

[56] References Cited

U.S. PATENT DOCUMENTS

| | | | |
|---|---|---|---|
| 4,188,956 | 2/1980 | John | 128/731 |
| 5,315,700 | 5/1994 | Johnston et al. | 395/163 |
| 5,361,140 | 11/1994 | Hayenga et al. | 358/446 |
| 5,499,097 | 3/1996 | Ortyn et al. | 356/372 |
| 5,528,703 | 6/1996 | Lee | 382/257 |
| 5,544,256 | 8/1996 | Brecher et al. | 382/149 |
| 5,557,097 | 9/1996 | Ortyn et al. | 250/201.3 |
| 5,581,631 | 12/1996 | Ortyn et al. | 382/128 |
| 5,619,428 | 4/1997 | Lee et al. | 364/551.01 |
| 5,621,519 | 4/1997 | Frost et al. | 356/124.5 |
| 5,625,706 | 4/1997 | Lee et al. | 382/128 |
| 5,627,908 | 5/1997 | Lee et al. | 382/133 |
| 5,638,459 | 6/1997 | Rosenlof et al. | 382/133 |
| 5,642,433 | 6/1997 | Lee et al. | 382/199 |
| 5,642,441 | 6/1997 | Riley et al. | 382/255 |
| 5,647,025 | 7/1997 | Frost et al. | 382/255 |
| 5,699,447 | 12/1997 | Alumot et al. | 382/145 |
| 5,754,676 | 5/1998 | Komiya et al. | 382/132 |

OTHER PUBLICATIONS

Marr, D. and Hildreth, H, "Theory of Edge Detection," Proc. Roy. Soc. London, vol. B207: 187–217, 1980.
Rosenfeld, A. Ed., "Multiresolution Image Processing and Analysis," New York: Springer–Verlag, 1984.
Serra, J, "Image Analysis and mathematical Morphology," London: Academic, 1982.
Devijer P., Kittler J: "Pattern Recognition. A Statistical Approach." Prentice Hall, Englewood Cliffs, London, 1982.
Ikeda S., Ochiai, M, Sawaragi, Y. "Sequential GMDH Algorithm and Its Application ot River Flow Prediction" IEEE Trans. Syst. Man Cybern. SMC–6(7):473–479.
Hart P.: "The Condensed Nearest Neighbor Rule." IEEE Transactions on Information Theory 14, 515–516, 1968.
Kohonen T., "The Self–organizing Map." Proceedings of the IEEE 78, 1464–1480, 1990.
Geva S. and Sitte J. "Adaptive nearest neighbor pattern Classification." IEEE Transactions on Neural Networks 2, 318–322, 1991.

(List continued on next page.)

*Primary Examiner*—Jose L. Couso
*Assistant Examiner*—Duy M. Dang
*Attorney, Agent, or Firm*—Hans I. Sun; George A. Leone; Emil Moffa

[57] ABSTRACT

An incremental concurrent learning method starts with providing potential defects and fabrication information and a primary classification rule and secondary classification rule selection from a knowledge defect database from multiple products with different process cycles. The method then performs a truth inquiry to update a classification rule database for use by the primary classification rule and secondary classification rule selection. The method performs a primary defect classification and checks the confidence of the classification, and performs a secondary defect classification if the confidence is not high. If the confidence of the secondary defect classification is not high, a new defect may have been discovered and a novelty defect detection step is performed to define artifacts or potential new defect types to provide information for the truth inquiry.

35 Claims, 11 Drawing Sheets

OTHER PUBLICATIONS

Lee, JSJ and Lin, C, "A Pipeline Architechture for Real–Time Connected Components Labeling", Proc. SPIE Advances in Intellige. Robotics Systems, Nov., 1988.

Bartels PH: "Numerical Evaluation of Cytologic Data: VII. Multivariate Significance Tests", Analyt. Quant. Cytol. 3:1–8, 1981.

Breiman et al.: "Classification and Regression Trees", Belmont, California, Wadsworth, 1984.

Acharya et al., "Mathematical Morphology for 3–D Image Analysis", 1988 International Conference on Acoustics, Speech, and Signal Processing, pp. 952–955, ©1988 IEEE.

Adelson et al., "Modeling the human visual system", RCA Engineer, 27:6, Nov./Dec. 1982, pp. 56–64.

Adelson et al., "Orthogonal pyramid transforms for image coding", SPIE vol. 845 Visual Communications and Image Processing II (1987), pp. 50–58.

Burt, Peter J., "Fast Filter Transforms for Image Processing", ©1981 by Academic Press, Inc., Computer Graphics and Image Processing, vol. 16, pp. 20–51 (1981).

Burt et al., "The Laplacian Pyramid as a Compact Image Code", ©1983 IEEE, IEE Transactions on Communications, 31:4, Apr. 1983, pp. 532–540.

Campbell et al., "Application of Fourier Analysis to the Visibility of Gratings", J. Physiol. 1968, 197, pp. 551–567.

Esteban et al., "Application of Quadrature Mirror Filters to Split Band Voice Coding Schemse", IBM Laboratory, 06610 La Gaude, France, pp. 191–195.

Gharavi et al., "Application of Quadrature Mirror Filtering to the Coding of Monochrome and Color Images", ©1987 IEEE, pp. 2384–2387.

Lee et al., "A Novel Approach to Real–Time Motion Detection", ©1988 IEEE, pp. 730–735.

Lee et al., "A Processing Strategy for Automated Papanicolaou Smear Screening", ©The International Academy of Cytology, Analytical and Quantitative Cytology and Histology, 14:5, Oct. 1992, pp. 415–425.

Lee et al., "Adaptive Image Processing Techniques", SPIE vol. 848, Intelligent Robots and Computer Vision: Sixth in a Series (1987) pp. 255–262.

Lee et al., "Morphologic Edge Detection", ©1987 IEEE, IEEE Journal of Robotics and Automation, vo. RA–3, No. 2, Apr. 1987, pp. 142–156.

Maragos, Petros, "Pattern Spectrum and Multiscale Shape Representation", ©1989 IEEE, IEEE Transactions on Pattern Analysis and Machine Intelligence, 11:7, Jul. 1989, pp. 701–716.

Sternberg, Stanley R., "Grayscale Morphology", Computer Vision, Graphics and Image Processing 35, pp. 333–355 (1986).

Watson, Andrew B., "The Cortex Transform: Rapid Computation of Simulated Neural Images", Computer Vision, Graphics and Image Processing, 39, pp. 311–327 (1987).

| Fig-3A |
|--------|
| Fig-3B |

K–NN
KTH NEAREST NEIGHBOR
5TH NEAREST NEIGHBOR

METHOD AND APPARATUS FOR INCREMENTAL CONCURRENT LEARNING IN AUTOMATIC SEMICONDUCTOR WAFER AND LIQUID CRYSTAL DISPLAY DEFECT CLASSIFICATION

The invention relates to a method and apparatus for semiconductor wafer defect and liquid crystal display defect classification and more particularly to a method and apparatus for providing incremental concurrent learning to an automatic semiconductor wafer defect classification system.

BACKGROUND OF THE INVENTION

Complex and very expensive automated systems are available to locate and detect potential anomalies on semiconductor wafers and liquid crystal displays quickly. However, determining whether these anomalies are actually defects and, if so, obtaining their precise location assessing their impact on the performance of the die when packaged, and diagnosing their cause still requires manual classification. These time-consuming methods are very slow and inconsistent. Results vary with time available, knowledge, training, ability and fatigue of the operator. On review, human experts in average agree with only 62 percent of visual classifications. Experts' agreement with their own classifications diminish markedly over time so that at the end of a month, agreement with their own classifications can be below 50%. These problems, widely observed in diverse task environments, are associated with limitations of human memory and cognition. To ensure consistent quality control for submicron semiconductor manufacturing processes and liquid crystal display manufacturing processes, automatic defect classification, that is directly associated with determination of cause, is necessary.

Types of macro and micro defects include: Gray Spot, Gray Streak, Gray Spot and Gray Streak, Particles, Multi-Layer Structure, Line Break, Subsurface Line, Scratch, Hillocks, Grass, Worm-hole, Starburst, Speedboat, Orange Peel, Resist Gel Defect, Controlled Collapse Chip Connection (C4), Microbridge, Submicron, Micron, Micron Sphere, U. Pattern, Contamination, Protrusion, Break, Intrusion, Nuisance, Mask-Related (Shorts), Haze, Microcontamination, Crystalline (Stacking Fault), Spots, Break, Reticle, Hard-Defects (Pinholes, Pindots, Extrusions), Semi-Transparent (Resist Residues, Thin Chrome), Registration (Oversized, Undersized, Mislocated), Corner, Extra Metal, Metal Missing and Opens (Pattern Missing).

Because of the dynamic nature of the incidence of semiconductor defects, establishing a set of defect classes or descriptions in advance that covers all possible defects is not possible and efficient. The high degree of customization required for each application adds another dimension to the inherent difficulties. An automatic defect classification system must be able to add and delete defects from a set of reference examples as well as to alter or refine classification rules at any time as production circumstances and requirements change. Furthermore, new defect classes may arise as the process evolves or as new types of equipment are introduced. An automatic defect classification system should also be capable of learning new classes.

Because operators cannot be economically trained to create and edit knowledge bases containing expert system rules, the system should advantageously be able to acquire such rules directly and automatically from images of defects selected as examples. Information about previous and related defects, including images of them, must be made readily available to technical personnel involved in the diagnosis of defects and those that take measures to deal with their causes.

The number of defect examples available for each class of defect can be quite small. Thus, the defect classification and diagnosis system must be able to achieve a high level of accuracy with as few as three examples for each class of defect, and must be capable of being quickly and easily modified.

SUMMARY OF THE INVENTION

This invention discloses a method and apparatus for incremental concurrent learning that allows automatic update of the classification rules for highly robust classification of defects in an automatic semiconductor wafer defect and a LCD classification environment. The invention not only provides automatic defect classification capability but also allows for updating of the system to deal with changing product design and process cycles. The system can handle new defect types with a small number of defect examples. In addition, the system allows for human interaction by not forcing classification of questionable objects and can automatically organize defect examples and display them to a human operator, along with similar defects with known types for human verification and truth labeling.

The defect classification results can be encoded into profiles for different products, and process cycles for quality control evaluation and yield management.

The invention provides a method of incremental concurrent learning comprising the steps of; providing potential defects and fabrication information, providing a classification rule selection from a defect knowledge database from multiple products with different process cycles, performing a truth inquiry to update a classification rule database for use by the classification rule selection, performing a single stage classification having at least one classification output and, at least one confidence output, checking the at least one confidence and if the confidence of the at least one classification is high, defining the classification outcome and providing the classification outcome to the classification rule selection step, and if the at least one confidence is not high, questioning the classification outcome and sending the potential defects to the novelty defect detection module, and performing a novelty defect detection step to define artifacts or a potential new defect type to provide information for the truth inquiry.

Further, the invention provides that a novelty detection step comprises: providing potential novel defects, performing artifact rejection of potential novel defects and generating an artifact database and potential novel defect database, and performing a clustering of a potential novel defect database to provide use of clusters and other objects providing a truth determination of the defect clusters to update the potential novel defect database.

The invention further performs automatic classification rule generation that comprises providing defect samples with truth labels where features are selected, performing a sample editing on the defect database, and performing a condensing of an output of the sample editing.

The invention performs adaptive learning for the initialization of prototypes, performs adaptive learning with a LVQ method, and generates high and low confidence thresholds for the rules to be generated.

The invention further performs a truth inquiry further comprises the steps of editing and condensing a defect cluster, and performing a similarity detection step to compare known defects to representative unknown defects.

The invention further provides a defect knowledge database comprising a plurality of products wherein each product has a processing layer where each processing layer has a plurality of defect types wherein each defect type has a plurality of rules wherein each rule has a prototype.

The invention detects defects on semiconductor wafers or liquid crystal displays.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying Ad drawings.

DETAILED DESCRIPTION OF THE PREFERRED EMBODIMENT

Figure 1:
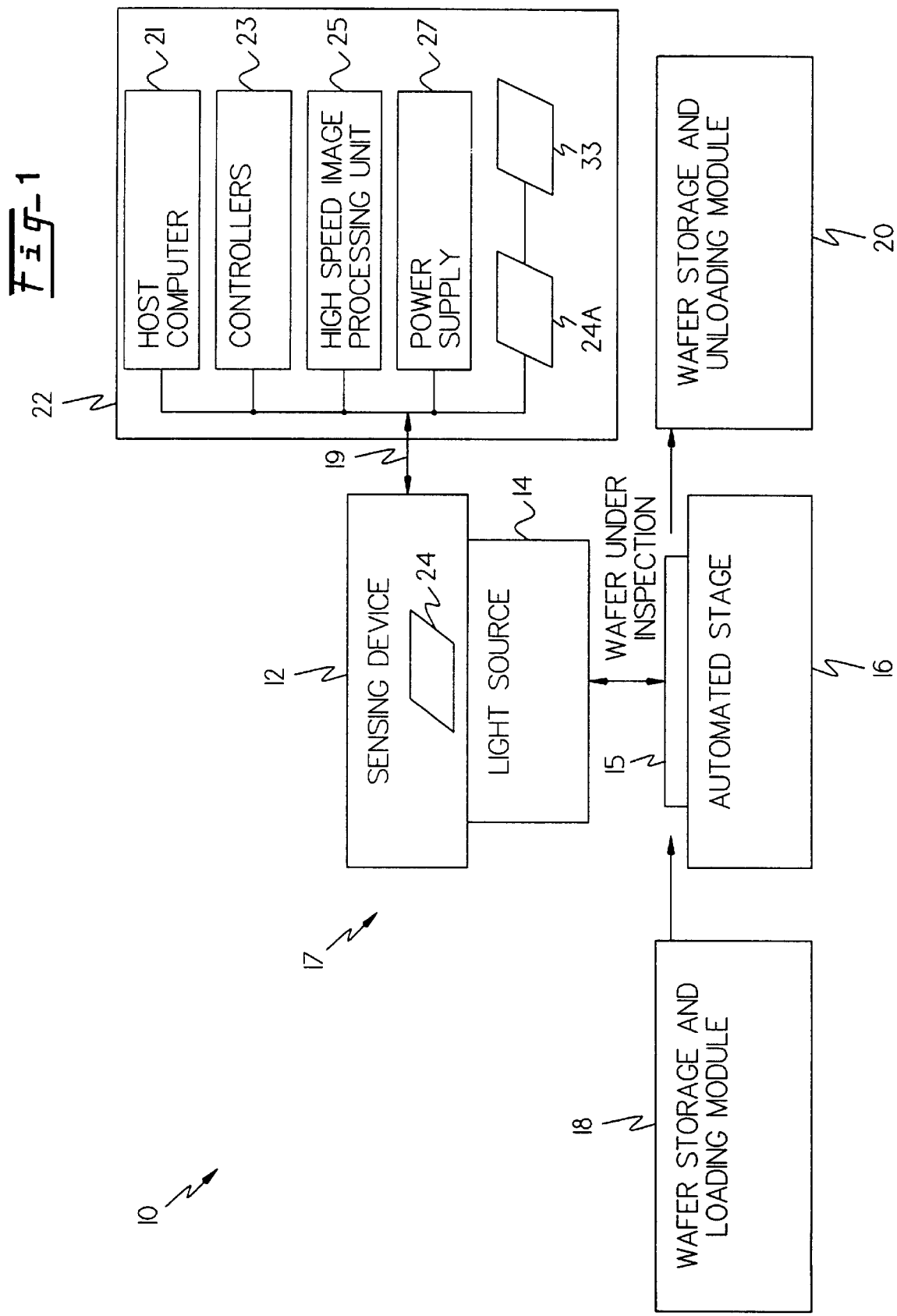
FIG. 1 shows the method and apparatus of the invention.

Refer now to FIG. 1 which shows the method and apparatus of the invention. The apparatus for incremental concurrent learning in automatic semiconductor wafer and liquid crystal display defect classification comprises a wafer storage and loading module 18 and a wafer storage and unloading module 20, where both can be combined into one module, to transport a wafer 15 to and from an automated stage 16. The automated stage 16 moves the wafer 15 under a microscope 17 for scanning. The invention further provides a light source 14 and a sensing device 12 to image the area of the wafer 15 under inspection. A processing unit 22 comprises a host computer 21, multiple controllers 23, a high speed image processing unit 25 and a power supply 27. The sensing device sends a raw image 24 to processing unit 22 through connection 19. The processing unit 22 controls the scanning of the wafer 15 and performs the image decomposition and synthesis processing for automatic inspection. The high speed image processing unit 25 operates to facilitate the information extraction process by implementing the decomposition and synthesis method in software. The method decomposes the raw image data 24 into a set of partial information channels, each channel reflects certain aspects, a modality, of the information. The partial information can thus be processed independently or cooperatively and synthesized to recover the original image as recovered image 24A or to construct an improved image 33. In this manner, useful information can be retained and irrelevant information can be rejected effectively.

Figure 2:
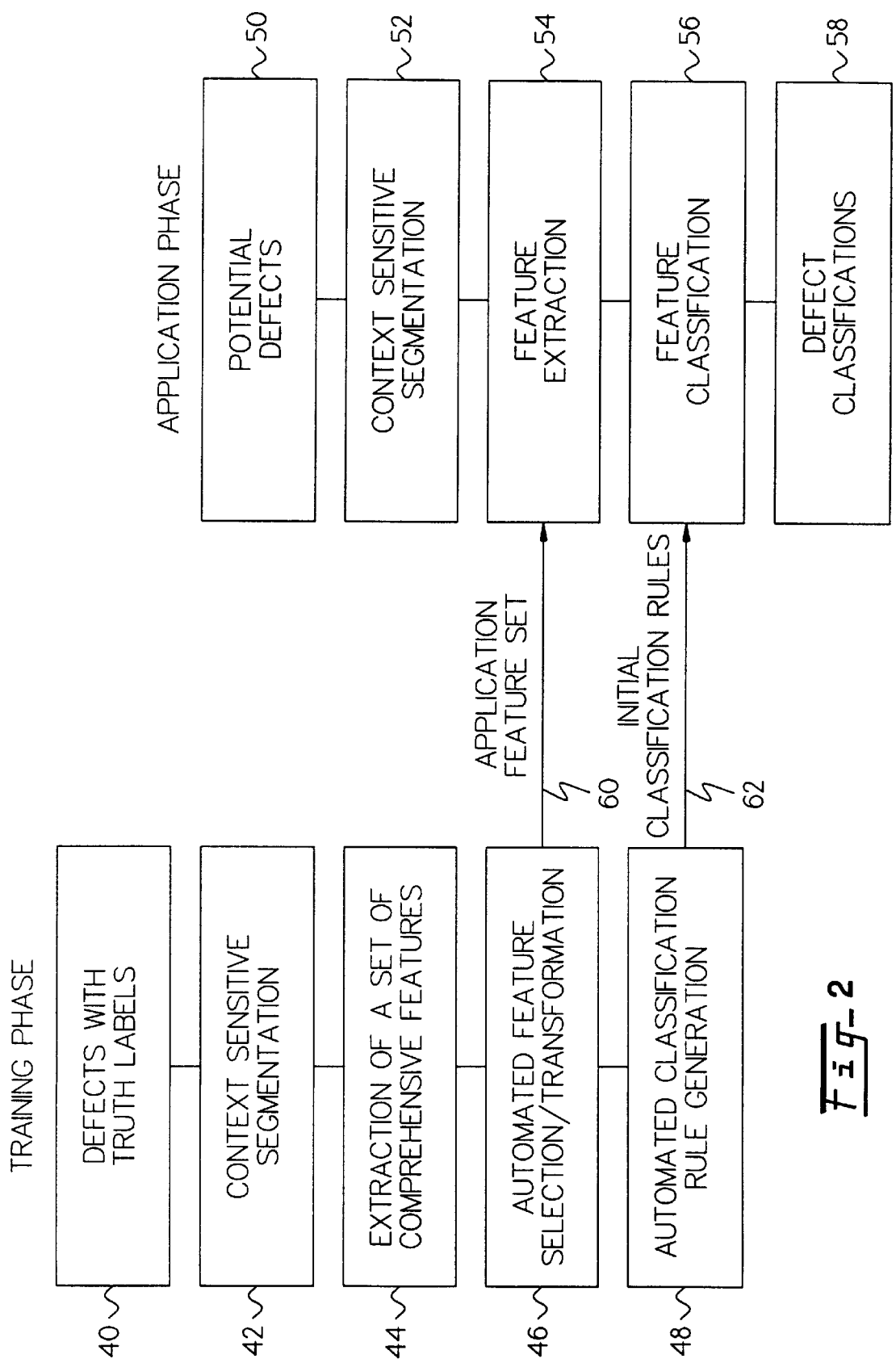
FIG. 2 shows the training and application phase of the automatic wafer defect classification system.

Refer now to FIG. 2 which shows the training and application phase of the automatic wafer defect classification system 10. In the training phase, defect images with truth labels 40 are input to a context sensitive segmentation step 42. The output of the context sensitive segmentation step 42 is input to the extraction step 44, which extracts a set of comprehensive features from the segmented image. The output of the extraction step 44 is sent to an automatic feature selection and transformation step 46 that provides an application feature set 60 used in the application phase. The automatic feature selection and transformation step 46 provides an input to the automated classification rule generation step 48. After the automated classification rule generation step 48, the initial classification rules 62 are sent to the application phase. In the application phase, potential defects 50 are provided to a context sensitive segmentation step 52. The output of the context sensitive segmentation is a segmented image. Both the segmented images and the defect images are provided to feature extraction step 54. The feature extraction step takes the application feature step 16 and provides information for future classification in step 56. The output of feature classification step 56 is defect classifications 58.

In operation, the defect classification system of the automatic wafer defect classification system implements a training phase and an application phase. In the training phase, knowledge is acquired directly from defect images 40. Sufficient examples of defect images with truth labels are processed by the system. The defect objects 40 are first. segmented 42 and a set of comprehensive features are extracted 44 from the images of the segmented objects. The extracted features with object truth labels are used to select the significant feature set 60 for further analysis. Using the significant feature set 60, new features are generated by feature transformation methods. Based on the selected and transformed features, classification rules are automatically generated 48 for defect classifications.

Figure 9:
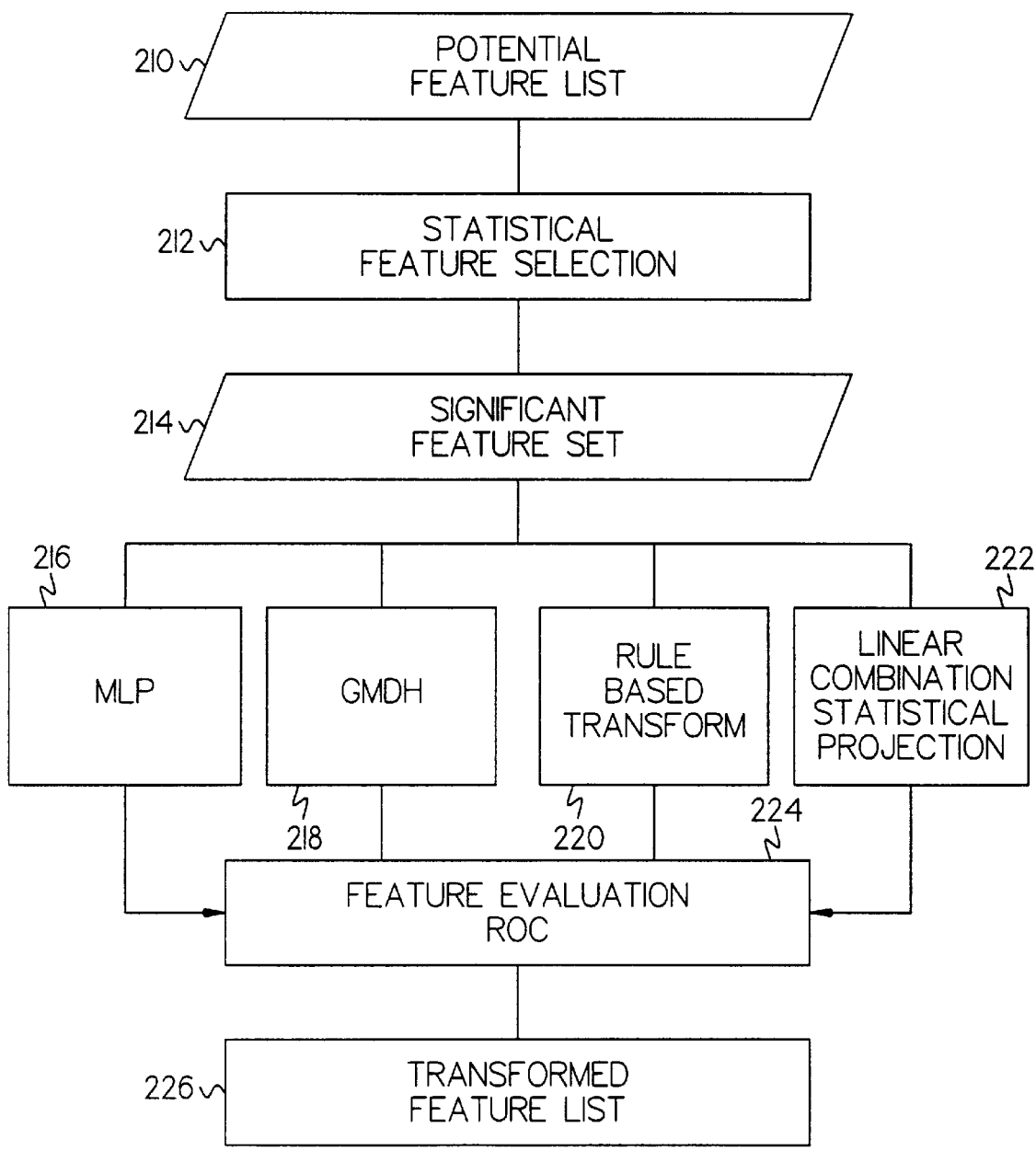
FIG. 9 shows the method of the invention to generate a transformed feature list.

Refer now to FIG. 9 which shows the method of the invention to generate transformed features. The method starts by providing a potential feature list 210. Statistical feature selection is performed in step 212. In one embodiment of the invention, the stepwise discriminant method is used to do feature selection by evaluating the significance of F-test statistics from an analysis of covariance. The output of the statistical feature selection is a significant feature set 214. The significant feature set 214 is then used by four methods to generate potential features for evaluation in step 224. The feature evaluation process 224 evaluates the effectiveness of the transformed features from the transformation methods by computing the areas under a receiving operating curve. The larger the area, the greater the effectiveness of the transformed feature. The output of the process is a list of selected transformed features 226.

The first method is the multilayer perceptron (MLP) 216. MLP is one type of ANN using unsupervised backpropagation method to learn the network weights. Given the selected features and defect samples with true labels, backpropagation learning method is applied to determine the network weights. These learned weights define the nonlinear formula to transform the feature set into transformed features. The number of transformed features are usually much smaller than the original features.

The second method is the group method of data handling GMDH 218. GMDH is a method to model complex output. (transformed features) by input features using recursive generations of linear or nonlinear regression molds using pairs of features or derived features as input.

The third method is the rule based transfer method 220.

The fourth method is the statistical linear projection 222. This method computes multiple discriminant analysis on C-class defect data. The method is a generalization of the Fisher's Linear Discriminant involving C-1 discriminant functions. The Fisher's Linear Discriminant is a well-known statistical method for feature projection.

In the application phase, the potential defects 50 are automatically segmented 52 from their images. The features of the objects are extracted 54 and the classification rules are applied to classify 56 the potential defects into artifacts or different defect types 58. If no definite outcome can be achieved, the system provides a questionable outcome label to alert a human operator that manual analysis may need to be performed.

In a preferred embodiment of the invention, the object, segmentation method disclosed in the "Method for Identifying Objects Using Data Processing Techniques", U.S. Pat. No. 5,528,703 can be used for object segmentation, such as that performed in steps 42 and 52. The comprehensive feature set 60 includes single features such as size, shape, texture, contrast, color, etc., pairs of features and their relationships such as connect, adjacent, touch, inside, outside, etc., and multiple features with higher level relationships.

In one embodiment, the feature selection method 46 comprises methods such as the stepwise discriminate analysis. Stepwise discriminate analysis can be used to select the features having the highest discriminate power for classification in a well known manner.

In one embodiment, the feature transformation step 46 can be accomplished by statistical feature extraction, methods such as Group Method of Data handling, among others. The selected features along with the transformed features are used to train the defect classifier. The Classification And Regression Trees (CART) can be automatically generated and be used as the basis for the classifiers. Since there may only be small number of samples per defect type for training and incremental learning, this capability is required for this application, other classification methods such as k nearest neighbor rule (k-NN) or its derivatives can be used to better provide the desired functions.

As memory and computational capacity increase, for example, exponentially in the past decade, and if the same growth pace is expected for the next decade, non-parametric supervised classification rules such as the k nearest neighbor rule (k-NN) which are memory and computational demanding yet very flexible, become feasible for semiconductor defect classification. However, the requirement of a large training set to ensure convergence of the K-NN rule is the main drawback of the nearest neighbor rules in practical problems. Moreover, non-parametric supervised classification rules can be negatively influenced by incorrectly labeled training samples, "noisy" samples or outliers. In a preferred embodiment of this invention, the K-NN rule is enhanced by an editing-condensing method and adaptive learning method.

The editing-condensing method improves the accuracy of the classification by removing samples located in overlapping acceptance surfaces, the editing method, and reduces the computational effort required to find the nearest neighbor (s), the condensing method. After a training set is edited and condensed, an adaptive learning method can be used. The adaptive learning method uses the training samples to tune a set of training examples known as prototypes. Adaptive learning is performed in two sequential phases: initialization and learning. The prototype set is initially a subset of the training set and the values of the prototypes are updated in an interactive learning process. Two different approaches may be used: the first is based on the use of learning vector quantization, LVQ, and its variations and the second is the decision surface mapping method, DSM.

In LVQ learning, the location of the prototypes in the representation space approximates the underlying probability densities using a number of updated prototypes, where updating occurs during training using a punishment-reward criterion. In one embodiment, a variation of the adaptive learning method learns the variable number of prototypes by adding or deleting the number of prototypes in the initial prototype set based on the nearest distance criteria is used.

The DSM places the prototypes, that approximate the decision boundaries, in the representation space. In both LVQ and DSM, the 1-NN classifier is used with the prototype set as the reference set.

In another embodiment, a nonparametric automatic rule generator based on a decision-tree method is used to generate classification rules.

Figure 8:
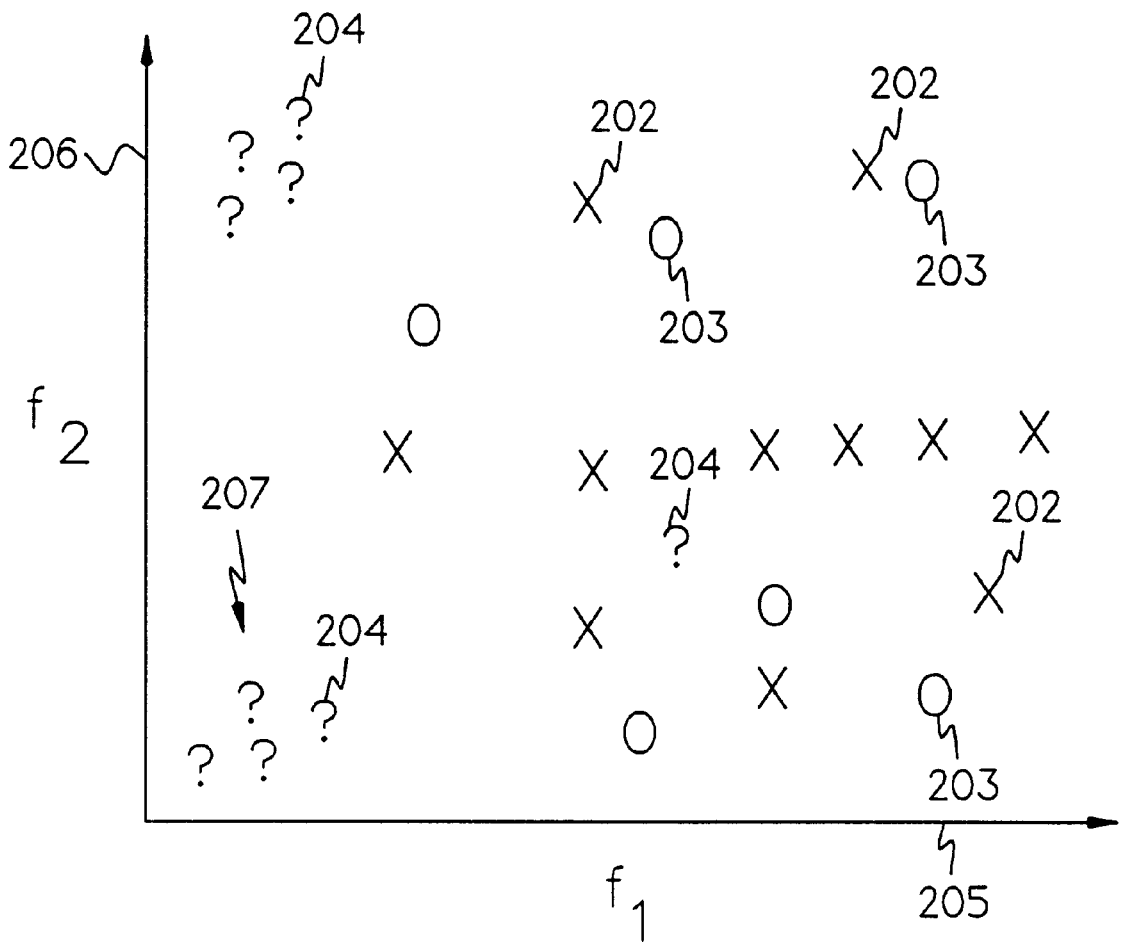
FIG. 8 shows the learning vector quantization method of the invention as applied to one example in feature space.

Refer now to FIG. 8 which shows the learning vector quantization method of the invention as applied to one example in feature space. Two features are shown, feature f1 205 and feature f2 206. Two types of known objects, object x 202 and object o 203 and potentially new objects 204 are also shown. FIG. 8 shows that a cluster 207 of potentially new objects 204 that do not meet the criteria for an object x 202 nor an object o 203 may be grouped as a new object type. Different training sets are generated for defects of different products and different processing cycles. The editing and LVQ methods are applied to each of the different training sets to generate prototype sets of the different classifiers.

After the prototype set is generated for a classifier, the original training sets are re-applied to the classifier and the difference between each training sample and its nearest prototype of the same defect type is recorded. The distributions of the difference values are used to generate a high confidence threshold and a low confidence threshold for each defect type of the classifier. Any object with a feature difference to the nearest prototype less than the high confidence threshold can be confidently classified as a defect of the same type as the nearest prototype. Any object with a feature difference to the nearest prototype greater than the low confidence threshold cannot be confidently classified to the defect type of the nearest prototype. This is the case for unknown objects 204.

Figures 3, 3A:
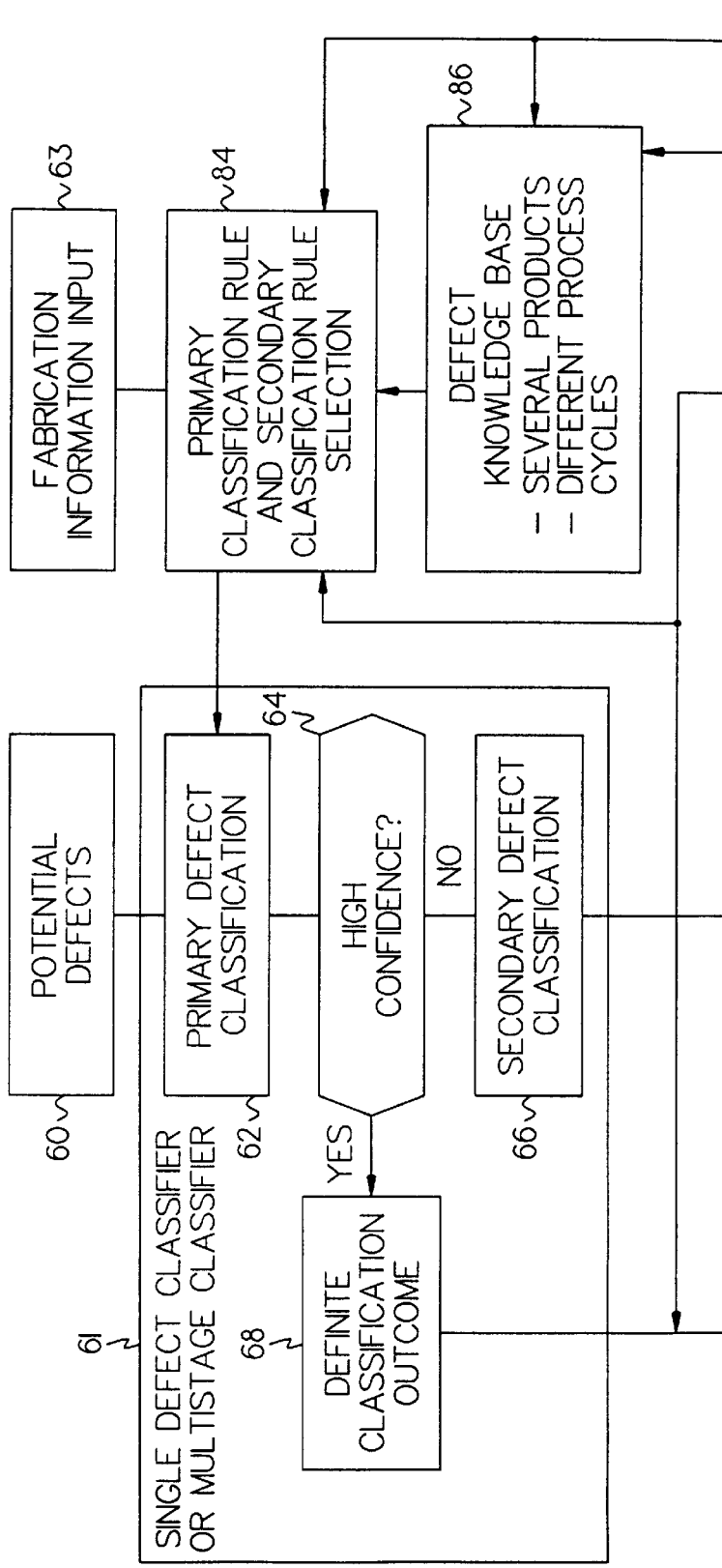
FIG. 3 shows the method of the invention to process potential defects by using fabrication information to control incremental concurrent learning.
Figure 3B:
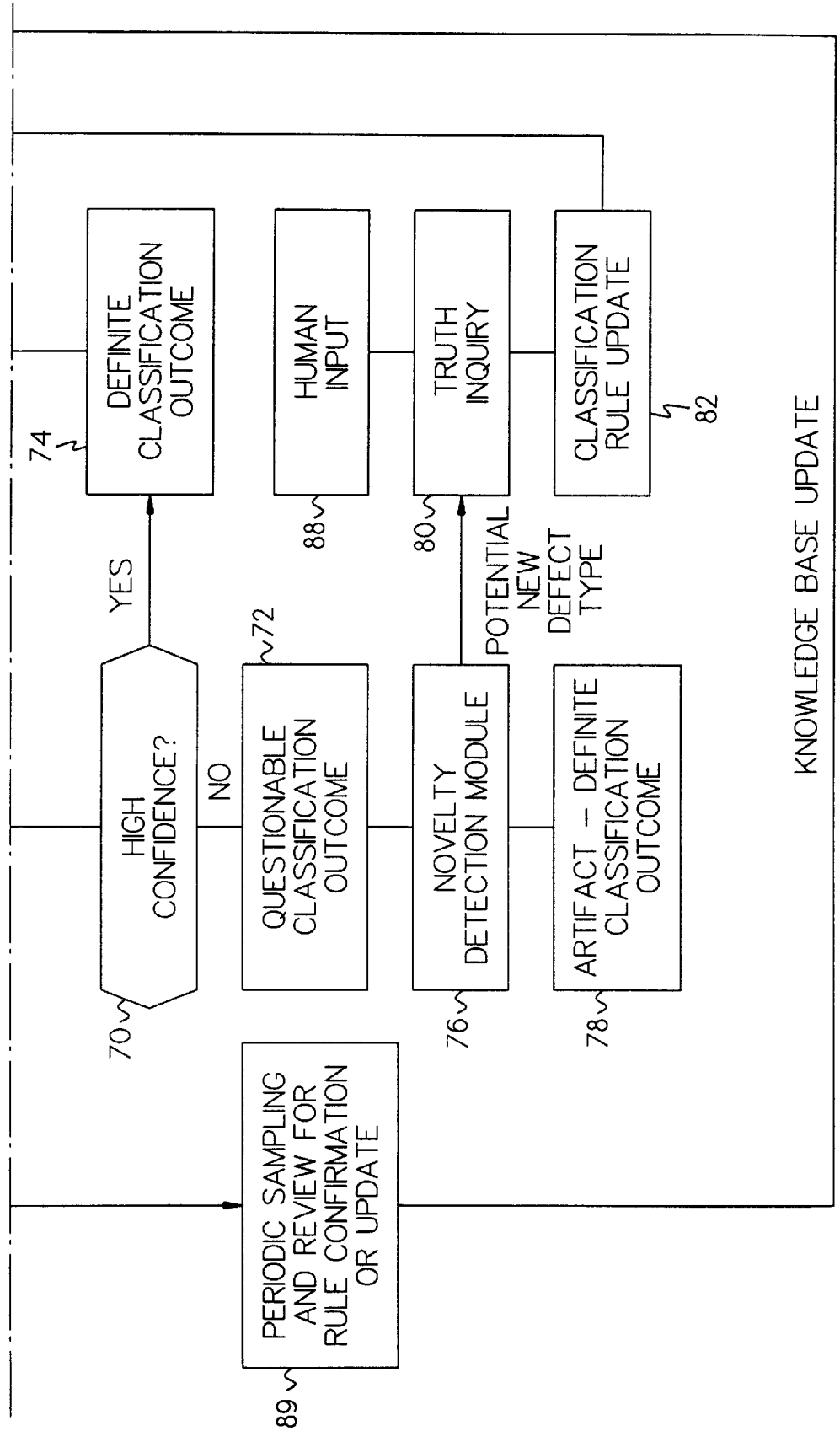

FIG. 3 shows the method of the invention to process potential defects by using fabrication information to control incremental concurrent learning. Potential defects 60 are provided to defect classification subsystem 61. The defect classification subsystem 61 comprises a single classifier or a multistage classifier. In one embodiment, the multistage classifier comprises two classifiers: primary classifier 62 and secondary classifier 66. In an alternate embodiment, a single classifier 61 comprises the primary classifier 62. Primary defect classification step 62 makes a determination in step 64 of whether or not the primary defect classification step 62 has provided an output having high confidence. If the output has high confidence, the classification determines a definite classification output 68. The definite classification output 68 may be provided to step 89 for periodic sampling and review.

If there is not high confidence in the primary defect classification step 64, the process flows to step 66 to determine the secondary defect classification in step 66. The process then determines whether or not the secondary defect classification is of high confidence in step 70. If the secondary defect classification is of high confidence, the process flows to step 74 to determine a definite classification outcome. The definite classification output 68 may be provided to step 89 for periodic sampling and review. In step 89, the method performs periodic sampling and review for rule confirmation or update as shown in greater detail with respect to FIG. 10. Rule confirmation or update from step 89 may be provided as input to the defect knowledges database 86 or to the primary classification rule and secondary classification rule selection 84.

If the confidence is not high in step 70, the process flows to step 72 to reconcile the questionable classification outcome. The process then flows to step 76 to perform novel defect detection. In outcome 78, the artifact classification outcome is defined with the novel defect detection step 76. The result of the novel defect detection step 76 is also provided to a truth inquiry step 80 which provides a potential, new defect type. In step 70, if the confidence for the classification was high, the classification result is provided, to step 84 which also receives fabrication information input 61. The primary classification rule and secondary classification rule selection step 84 provides primary classification and secondary classification rules to the primary defect classification step 62. In step 88, humans are queried as to the truth of the potential new defect type. If the potential new defect type is indeed a real new defect type, the true defect types and classification rules in the defect knowledge database are updated in step 82. In classification rule update 82, the primary classification rule and secondary classification rules selected in step 84 are updated to include the new defect type rules for subsequent classification. The defect knowledge database 86 receives the output of the classification rule update in step 82 and is updated.

In operation, the incremental concurrent learning module takes the inputs from the fabrication information system and selects a primary classification module and a secondary classification module from the database based on the current product and process cycle. The fabrication information can include: computer-aided design or CAD files, wafer electrical test results, histories of defects, defects on previous layers of the wafer, patterns of defects for an entire lot or production run, process models and histories, or wafer processing histories, among others. The rule selection could be done by a simple indexing scheme or more complicated expert system rule based approach. The result of the selection determines the primary defect classification module and secondary defect classification selection module 84.

The potential defect 60 is first classified by the primary classification module 62. If the resulting classification confidence is high, a definite classification outcome can be determined 68 and the classification process for this object is completed at this point and the system is ready for the next defect. If the classification confidence is low, the object will be classified by the secondary classification module 66. If the resulting classification confidence is high, a definite classification outcome can be determined in step 74. The classification process is completed and the system is ready for the next defect. If the classification confidence is low, the object could represent a new defect type and the object will be processed by the novelty detection module 76. The novelty detection module 76 could reject the object as an artifact or consider the object questionable and activate further novelty detection processes. After a sufficient number of the potential new defects are accumulated in the database, the novelty detection module 76 will attempt to identify a group of similar potential defects. A truth inquiry 80 is applied to the defect cluster. After the truth is determined, the defect knowledge database 86 and the classification rules 82 are updated using the new objects with their truth labels provided by human experts. In one embodiment of the invention, the defect classification results can be encoded into profiles for different products, and process cycles for quality control evaluation and yield management. Step 89 is a defect type sampling and review process for periodical rule confirmation or update. This module samples and reviews the defect classification outcome from the classification subsystem.

Figure 10A:
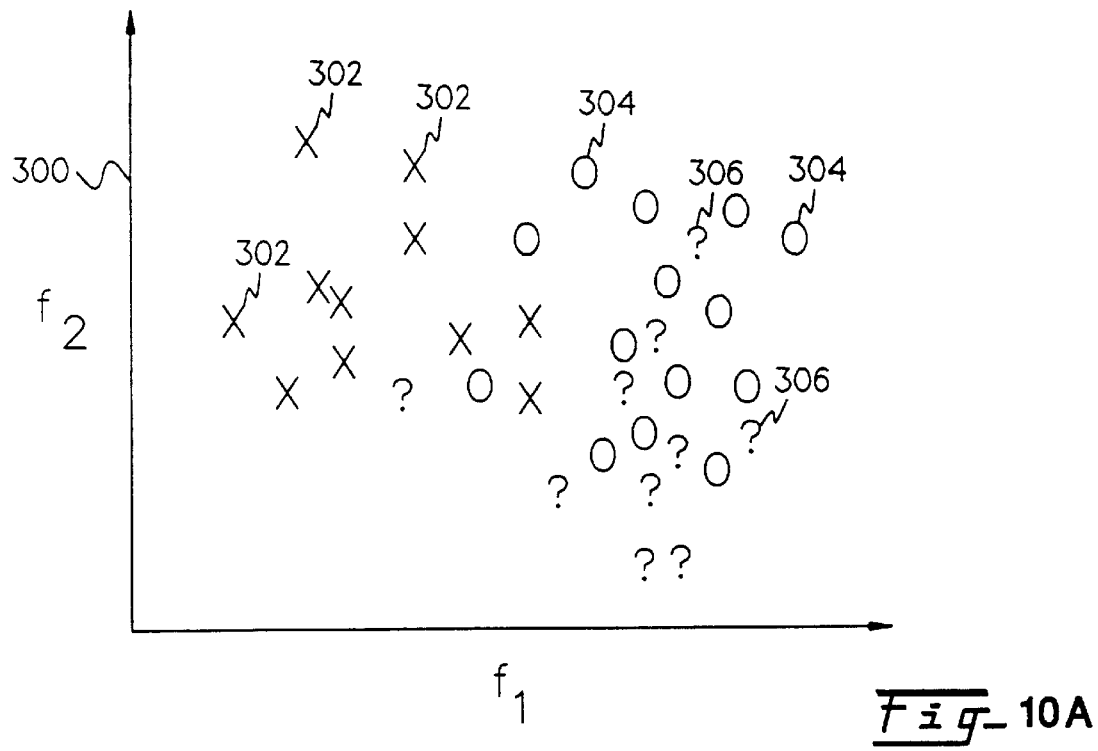
FIG. 10 shows one embodiment of a method of the invention for periodic sampling and classification rule confirmation or update.
Figure 10B:
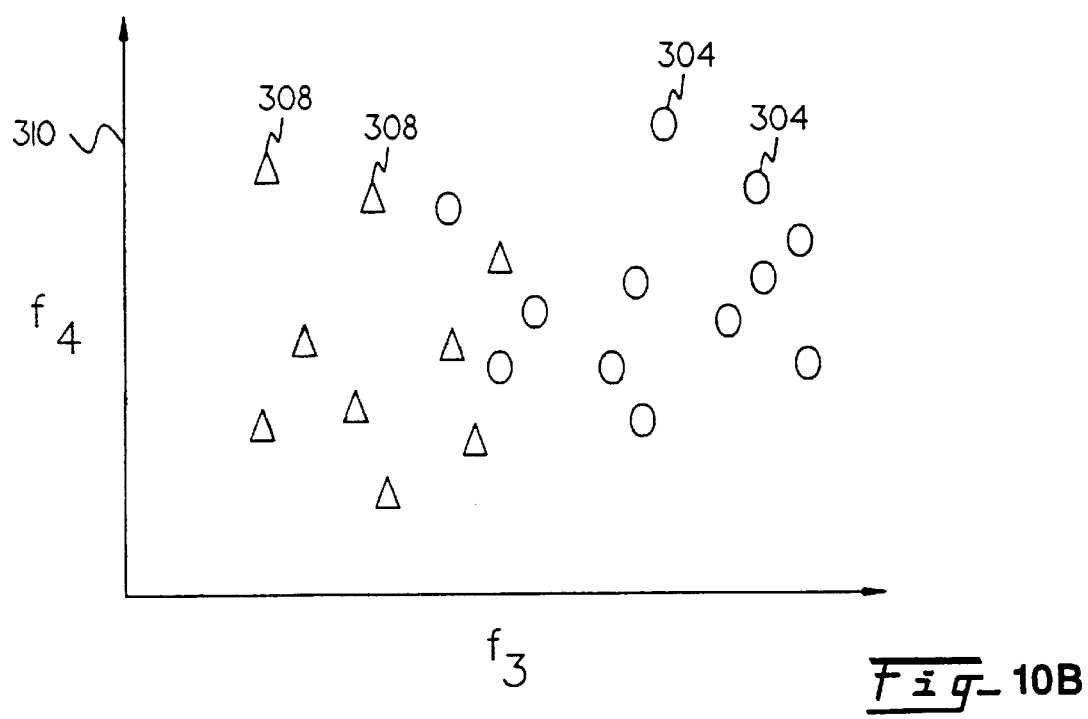

Refer now to FIG. 10 which shows one embodiment of a method of the invention for periodic sampling and classification rule confirmation or update. The method of the invention determines a graph 300 according to features $f_1$ and $f_2$ having a plurality of defect types 302, 304, 306. Defect types 306 may be initially classified with defect types 304. Random sampling review processes subsequently detect that defect objects 306 represent a new type of defect. The method selects a clustering method to select defect objects 304 and 306 for classification update. Using feature selection and transformation methods discussed in further detail with respect to FIG. 9, the method determines a new feature set, $f_3$ and $f_4$. The method then determines a graph 310 with the new feature set to distinguish the defect types 304, 308. The method then updates the rules in the database. The new feature set is added to the feature space area within the database.

The method for primary classification is similar to the method for secondary classification but use a different set of rules and different defect features. Given the fabrication information as an input, i.e., what product, what layer/process, the associated set of rules for primary and secondary classification are retrieved from the database to prepare for classification. Depending on the set of rules selected, their associated set of defect feature computation modules are enabled in the primary or secondary defect classification module.

In one example embodiment, each potential defect image is input to the module, features required for classification, such as size of the defect, shape, contrast, chromatic information, connectivity, adjunct, relative position (in/out) surrounding defect, etc., are computed. After the features are computed, the classification method such as LVD, K-NN is applied. The invention computes the feature distance between the defect features and all prototypes, the nearest prototype type and confidence are obtained. A prototype can be considered as a specific rule regarding the feature space.

One example of a Defect Rule Knowledge DataBase:

entries: product name, layer/process, defect type (feature_name1, value) . . . feature_nameN, value).

Figure 4:
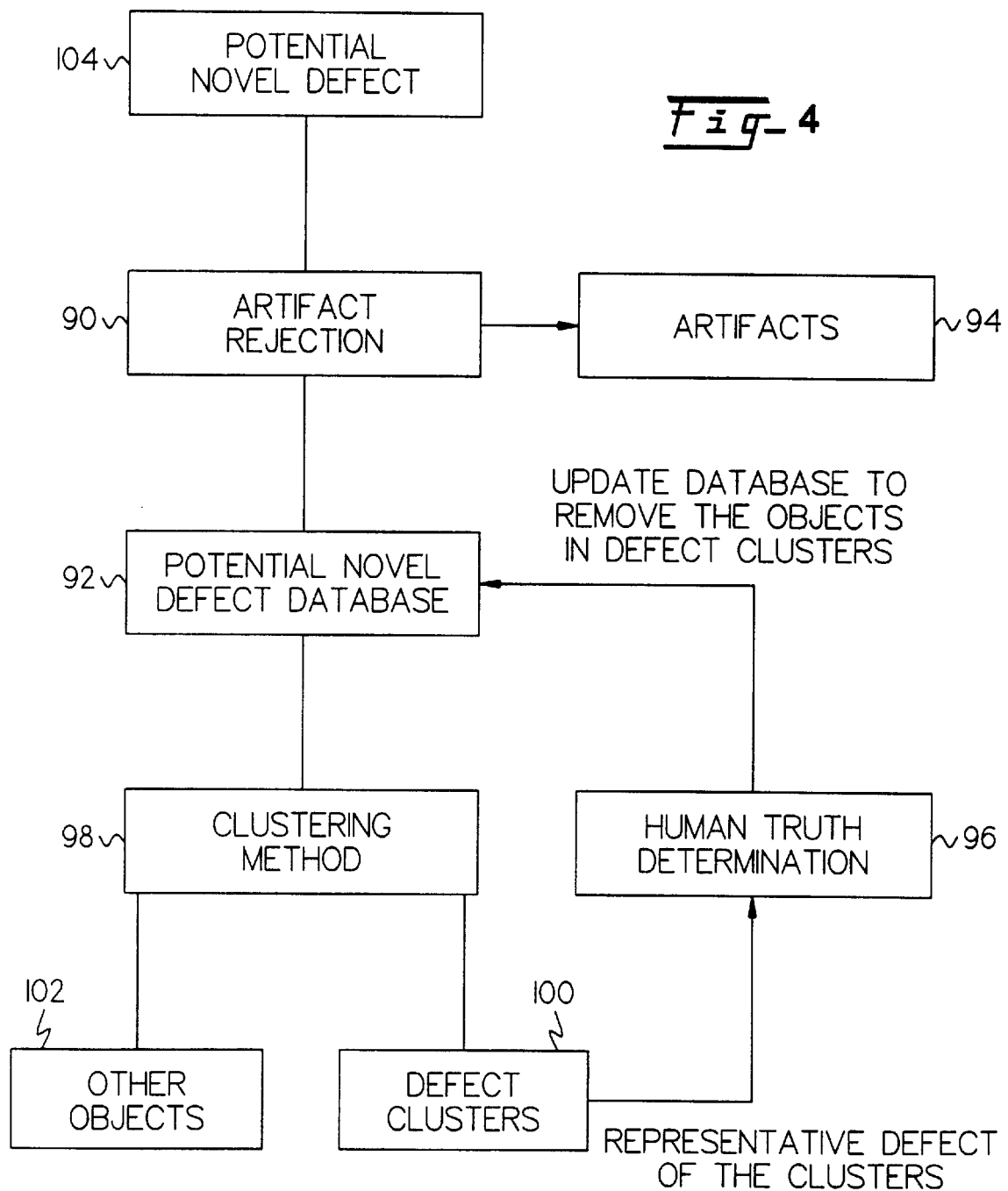
FIG. 4 shows the processing flow diagram of the invention to implement the novelty detection step.

Refer now to FIG. 4 which shows the processing flow diagram of the invention to implement the novelty detection step. Potential novel defects 104 are provided so that artifacts 94 may be rejected from the potential novel defect database 92. The potential novel defect database 92 is, in one embodiment, a fast-accessing database storing the set of detected potential novel defect samples, where each has a set of data including feature name and computed values for that product, layer/process. Other database types may also be used. The artifact rejection step 90 updates the potential novel defect database 92. The potential novel defect database 92 also has a human determination input from a truth inquiry, step 96. The human truth determination step 96 also receives defect clusters 100. In step 98, the output of a potential novel defect database 92 is clustered and the clustering method provides the defect clusters 100 with other types of objects 102. The updating database phase removes the objects in defect clusters from the potential novel defect database 92. An object with low classification confidence could represent an instance of a novel defect type. The object could also be simply an artifact. All objects with low classification confidence are processed by the novelty detection module. The module first applies an artifact. rejection stage to the input objects. If an object is determined to be an artifact, no further action is required. Otherwise, the object is used to update the potential novel defect database 92 and evaluates the similarity of the potential novel defect objects in the database by a clustering method 98. If no significant clusters of similar objects can be identified, the objects 102 are most likely artifacts caused by noise or random variations and no potential new defect types are detected. On the other hand, if defect clusters can be identified having multiple objects with similar feature profiles, the module has discovered potential new defect types. In this case, the module selects a subset of the most representative objects for human truth input. After human truth determination 96, the module updates the potential novel defect database 92 to remove the objects with known truth from the database.

The method for artifact rejection is very similar to the defect type classification. The invention uses a set of artifact classification rules developed for each product, layer/process, by the x nearest neighbor, X-NN method. However, there is no artifact type required in the artifact knowledge database.

In one embodiment of the invention, the potential novel defect database 92 stores potential new defects from multiple wafers and spans different products and processing cycles for evaluation. Unsupervised clustering methods are used to determine the significant clusters from the database. In one embodiment of the invention, the clustering step 98 uses isodata algorithm, fuzzy isodata algorithm, and the k means clustering algorithm, fuzzy c means clustering. These methods are based on the distance metric in feature space. To make sure only significant clusters are detected, a predetermined minimum difference threshold is required to qualify objects to include in a cluster and a cluster has to include at least a predetermined number of objects, for example ten, before the cluster will be considered.

Figure 5:
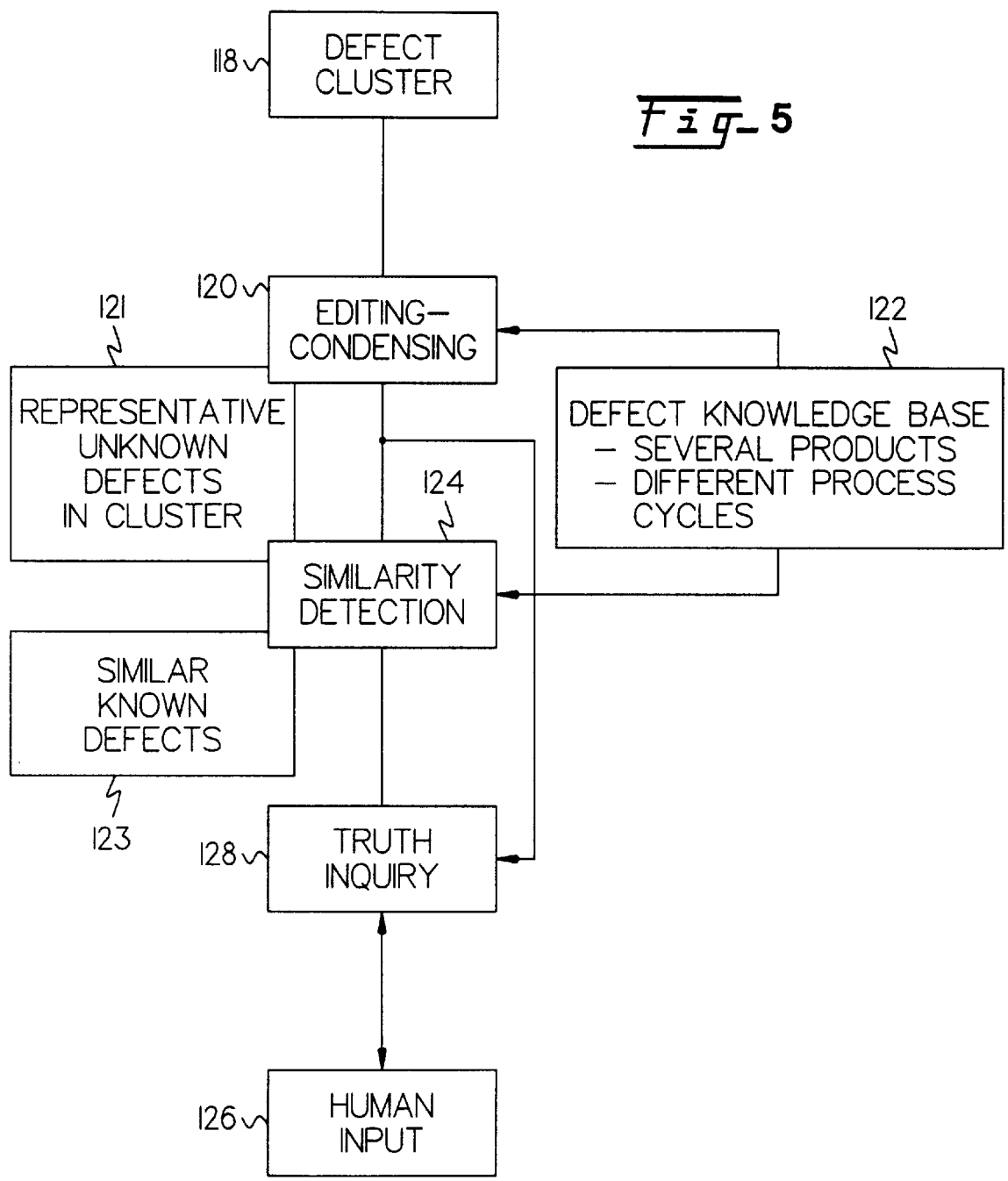
FIG. 5 shows a process flow diagram of the truth inquiry module of the invention.

Refer now to FIG. 5 which shows a process flow diagram of the truth inquiry module of the invention. After a defect cluster 118 is identified, the truth inquiry module applies an editing-condensing method 120 to select a subset of the defects as representative ones to be shown to human for truth inquiry in step 96. To enhance the human input process 126, known defects 123 in the defect database are compared, in a similarity detection step 124, with the selected unknown objects 121 and a predetermined number of the known defects which are most similar to the unknown objects are identified and are shown to the human 128 with their known defect types first before acquiring human truth for the new defects.

After human input 126, if new defect types are identified or if the objects represent a significant deviation from known defect types, the information will be entered into the defect knowledge database 122 and the classification rule will be updated using the editing-condensing and LVQ procedures of the new or existing defect classes. If the objects are determined to be artifacts, the artifact rejection stage 90 in FIG. 4 will be updated to incorporate the new artifacts for rejection.

Figure 6:
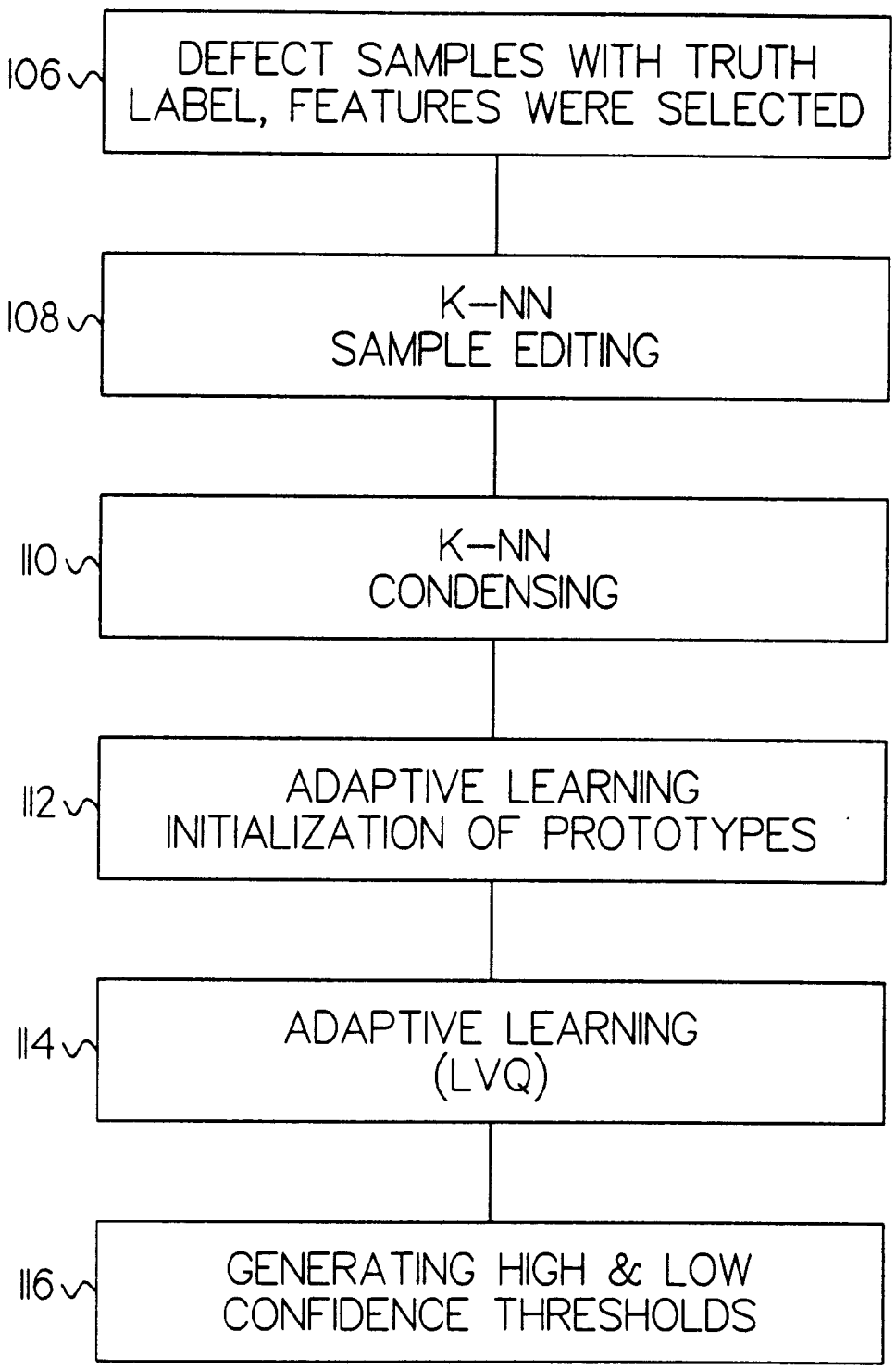
FIG. 6 shows the classification rule generation of the invention.

Now refer to FIG. 6 which shows the classification rule generation of the invention. The defect samples 106 with truth labels and feature selections are provided to a sample editing step 108. A k nearest neighbor, K-NN, condensing step is then performed in step 110. In step 112, adaptive learning is performed to initialize prototypes and in step 114 the adaptive learning uses the LVQ method. In step 116, the method generates high and low confidence thresholds. The high confidence threshold is predetermined based on the sensitivity and specificity requirements of the inspection.

Figure 7:
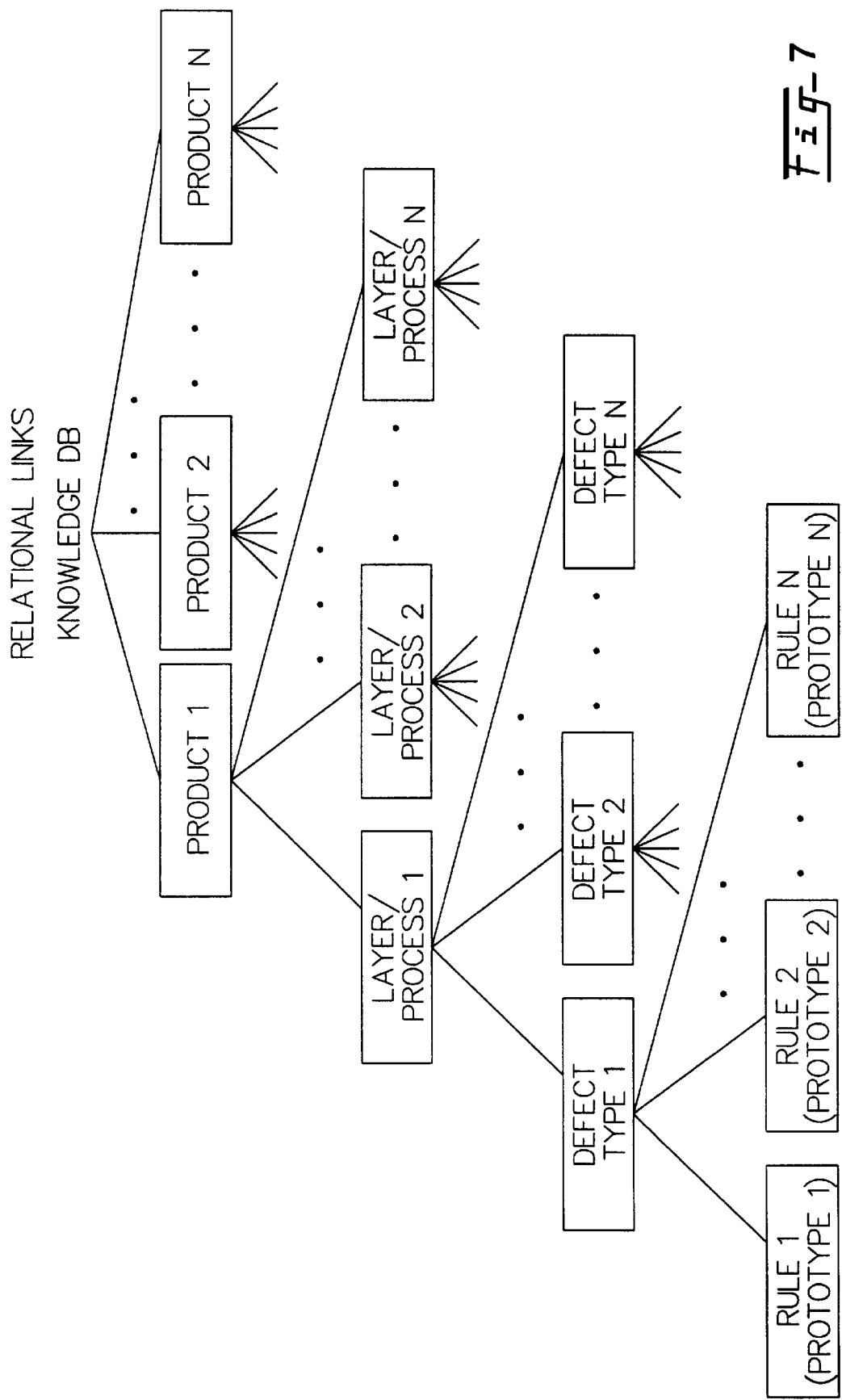
FIG. 7 shows the structure of the defect knowledge database of the invention.

The invention indexes the defect knowledge database by product, layer and process to select the appropriate set of rules for classification. Now refer to FIG. 7 which shows the defect knowledge database of the invention. The knowledge database is structured at a first level with a definition of a number of products, for example product 1, product 2, a through product N. Each product has an associated processing layer, each processing layer having multiple defect types known as defect type 1, defect type 2, and defect type N; where each defect type has a number of rules, each rule having an associated prototype. Two different products may share certain layer or process information. Likewise two different layers may share the same defect type information. The same prototype may be shared by two or more different products.

The following patents and patent applications are incorporated by reference hereto:

U.S. Pat. No. 5,787,188, issued Jul. 28, 1998, which is a file wrapper continuation a of abandoned U.S. patent application Ser. No. 07/838,064, entitled "Method For Identifying Normal Biomedical Specimens", by Alan C. Nelson et al., filed Feb. 18, 1992.

U.S. Pat. No. 5,528,703, issued Jun. 18, 1996, entitled "Method For Identifying Objects Using Data Processing Techniques", by S. J. Lee et al., filed Feb. 18, 1992.

U.S. Pat. No. 5,315,700, issued May 24, 1994, entitled "Method And Apparatus For Rapidly Processing Data Sequences", by Richard S. Johnston et al.

U.S. Pat. No. 5,361,140, issued Nov. 1, 1994, entitled "Method and Apparatus for Dynamic Correction of Microscopic Image Signals" by Jon W. Hayenga et al.

U.S. Pat. No. 5,912,699, issued Jun. 15, 1999, entitled "Method and Apparatus for Rapid Capture of Focused Microscopic Images" to Hayenga, et al., which is a continuation-in-part of abandoned U.S. patent application Ser. No. 07/838,063 filed on Feb. 18, 1992.

U.S. patent application No. 5,757,954, issued May 26, 1998, to Kuan et al. entitled, "Field Prioritization Apparatus and Method."

Pending U.S. patent application Ser. No. 08/309,061, filed Sep. 20, 1994, to Wilhelm et al., entitled "Apparatus for Automated Identification of Cell Groupings on a Biological Specimen."

Pending U.S. patent application Ser. No. 08/309,116, filed Sep. 20, 1994, to Meyer et al. entitled "Apparatus for Automated Identification of Thick Cell Groupings on a Biological Specimen."

U.S. Pat. No. 5,787,189, issued Jul. 28, 1998, which is a file wrapper continuation of abandoned U.S. patent application Ser. No. 08/309,115 to Lee et al. entitled "Biological Analysis System Self Calibration Apparatus."

U.S. Pat. No. 5,828,776, issued Oct. 27, 1998, which is a file wrapper continuation of abandoned U.S. patent application Ser. No. 08/308,992, to Lee et al. entitled "Apparatus for Identification and Integration of Multiple Cell Patterns."

U.S. Pat. No. 5,627,908, issued May 6, 1997, entitled "A Method for Cytological System Dynamic Normalization" by Lee et al.

U.S. Pat. No. 5,638,459, issued Jun. 10, 1997, entitled "Method and Apparatus for Detecting a Microscope Slide Coverslip" to Rosenlof et al.

U.S. Pat. No. 5,566,249, issued Oct. 15, 1996, to Rosenlof et al. entitled "Apparatus for Detecting Bubbles in Coverslip Adhesive."

Allowed U.S. patent application Ser. No. 08/309,931, filed Sep. 20, 1994, to Lee et al. entitled "Cytological Slide Scoring Apparatus."

U.S. Pat. No. 5,978,497, issued Nov. 2, 1999, to Lee et al. entitled "Apparatus for the Identification of Free-Lying Cells."

U.S. Pat. No. 5,740,269, issued Apr. 14, 1998, to Oh et al. entitled "A Method and Apparatus for Robust Biological Specimen Classification."

U.S. Pat. No. 5,715,327 issued Feb. 3, 1998, to Wilhelm et al. entitled "Method and Apparatus for Detection of Unsuitable Conditions for Automated Cytology Scoring."

U.S. Pat. No. 5,797,130, issued Aug. 18, 1998, to Nelson et al., which is a file wrapper continuation of abandoned U.S. patent application Ser. No. 08/153,293 entitled "Method for Testing Proficiency in Screening Images of Biological Slides", filed Nov. 16, 1993.

U.S. Pat. No. 5,699,794, issued Dec. 23, 1997, to Fleck, entitled "Apparatus for Automated Urine Sediment Sample Handling."

Pending U.S. patent application Ser. No. 08/485,182 to Lee et al., filed Jun. 7, 1995, entitled "Interactive Method and Apparatus for Sorting Biological Specimens."

U.S. Pat. No. 5,647,025, issued Jul. 8, 1997 to Frost et al., entitled "Automatic Focusing of Biomedical Specimens Apparatus".

U.S. Pat. No. 5,677,762, issued Oct. 14, 1997, to Ortyn et al., which is a file wrapper continuation of abandoned U.S. patent application Ser. No. 08/309,064 entitled "Apparatus for Illumination Stabilization and Homogenization."

U.S. Pat. No. 5,875,258, issued Feb. 23, 1999, to Ortyn et al., which is a file wrapper continuation of abandoned U.S. patent application Ser. No. 08/309,249 entitled "Biological Specimen Analysis System Processing Integrity Checking Apparatus."

U.S. Pat. No. 5,715,326, issued Feb. 3, 1998 to Ortyn entitled "Cytological System Illumination Integrity Checking Apparatus and Method."

U.S. Pat. No. 5,581,631, issued Dec. 3, 1996 to Ortyn et al., entitled "Cytological System Image Collection Integrity Checking Apparatus."

U.S. Pat. No. 5,557,097, issued Sep. 17, 1996, to Ortyn et al., entitled "Cytological System Autofocus Integrity Checking Apparatus."

U.S. Pat. No. 5,499,097, issued Mar. 12, 1996 to Ortyn et al., entitled "Method and Apparatus for Checking Automated Optical System Performance Repeatability."

U.S. Pat. No. 5,692,066, issued Nov. 25, 1997, to Lee et al., entitled "Method and Apparatus for Image Plane Modulation Pattern Recognition."

U.S. Pat. No. 5,799,101, issued Aug. 25, 1998, which is a file wrapper continuation of abandoned U.S. patent application Ser. No. 08/315,719, filed Sep. 30, 1994, by Lee et al., entitled "Method and Apparatus for Highly Efficient Computer Aided Screening."

U.S. Pat. No. 5,787,208, issued Jul. 28, 1998, to Oh et al., entitled "Image Enhancement Method and Apparatus."

U.S. Pat. No. 5,642,441, issued Jun. 24, 1997, to Riley et al., entitled "Apparatus and Method for Measuring Focal Plane Separation."

U.S. Pat. No. 5,625,706, issued Apr. 29, 1997 to Lee et al., entitled "Method arid Apparatus for Continuously Monitoring and Forecasting Slide and Specimen Preparation for a Biological Specimen Population."

U.S. Pat. No. 5,745,601, issued Apr. 28, 1998, to Lee et al., entitled "Robustness of Classification Measurement Apparatus and Method."

U.S. Pat. No. 5,671,288, issued Sep. 23, 1997 to Wilhelm et al., entitled "Method and Apparatus for Assessing Slide and Specimen Preparation Quality."

U.S. Pat. No. 5,621,519, issued Apr. 15, 1997 to Frost et al., entitled "Imaging System Transfer Function Control Method and Apparatus."

U.S. Pat. No. 5,619,428, issued Apr. 8, 1997 to Lee et al., entitled "Method and Apparatus for Integrating An Automated System to a Laboratory."

U.S. Pat. No. 5,781,667, issued Jul. 14, 1998, to Schmidt et al., entitled "Apparatus for High Speed Morphological Processing."

U.S. Pat. No. 5,642,433, issued Jun. 24, 1997 to Lee et al., entitled "Method and Apparatus for Image Contrast Quality Evaluation."

U.S. Pat. No. 5,867,610, issued Feb. 2, 1999, which is a divisional of U.S. Pat. No. 5,710,842, issued Jan. 20, 1998, to Lee, which is a divisional of U.S. Pat. No. 5,528,703, entitled "Method for Identifying Objects Using Data Processing Techniques."

U.S. Pat. No. 5,937,103, issued Aug. 10, 1999 to Oh et al., entitled "Method and Apparatus for Alias Free Measurement of Optical Transfer Function."

U.S. Pat. No. 5,654,535, issued Aug. 5, 1997, which is a divisional of U.S. Pat. No. 5,557,097, issued Sep. 17, 1996, to Ortyn et al., entitled "Cytological System Autofocus Integrity Checking Apparatus."

U.S. Pat. No. 5,812,692, issued Sep. 22, 1998 to Rosenlof et al., which is a divisional of U.S. Pat. No. 5,638,459, issued Jun. 10, 1997, entitled "Method and Apparatus for Detecting a Microscope Slide Coverslip."

Pending U.S. patent application Ser. No. 08/767,457 to Lee et al., filed Dec. 16, 1996 entitled "Method and Apparatus for Efficacy Improvement in Management of Cases With Equivocal Screening Results."

U.S. Pat. No. 5,892,218 issued Apr. 6, 1999, to Ortyn et al., which is a divisional of U.S. Pat. No. 5,654,535, issued Aug. 5, 1997, entitled "Cytological System Autofocus Integrity Checking Apparatus."

U.S. Pat. No. 5,760,387, issued Jun. 2, 1998 to Ortyn et al., which is a divisional of U.S. Pat. No. 5,654,535, issued Aug. 5, 1997, entitled "Cytological System Autofocus Integrity Checking Apparatus."

U.S. Pat. No. 5,841,124, issued Nov. 24, 1998 to Ortyn et al., which is a divisional of U.S. Pat. No. 5,654,535, issued Aug. 5, 1997, entitled "Cytological System Autofocus Integrity Checking Apparatus."

U.S. Pat. No. 5,763,871, issued Jun. 9, 1998 to Ortyn et al., which is a divisional of U.S. Pat. No. 5,654,535, issued Aug. 5, 1997, entitled "Cytological System Autofocus Integrity Checking Apparatus."

U.S. Pat. No. 5,877,489, issued Mar. 2, 1999, to Ortyn et al., which is a divisional of U.S. Pat. No. 5,654,535, issued Aug. 5, 1997, entitled "Cytological System Autofocus Integrity Checking Apparatus."

U.S. Pat. No. 5,883,982, issued Mar. 16, 1999, which is a divisional of U.S. Pat. No. 5,642,441, issued Jun. 24, 1997, to Riley et al., entitled "Apparatus and Method for Measuring Focal Plane Separation."

Pending U.S. patent application Ser. No. 08/888,115, filed Jul. 3, 1997, entitled "Method and Apparatus for Maskless Semiconductor and Liquid Crystal Display Inspection" by Lee et al.

Pending U.S. patent application Ser. No. 08/888,120, filed Jul. 3, 1997, entitled "Method and Apparatus for A Reduced Instruction Set Architecture for Multidimensional Image Processing" by Hayenga et al.

Pending U.S. patent application Ser. No. 08/888,119, filed Jul. 3, 1997, entitled "Method and Apparatus for Incremental Concurrent Learning in Automatic Semiconductor Wafer and Liquid Crystal Display Defect Classification" by Kuan et al.

Pending U.S. patent application Ser. No. 08/888,116, filed Jul. 3, 1997, entitled "Method and Apparatus for Semiconductor Wafer and LCD Inspection Using Multidimensional Image Decomposition and Synthesis" by Nelson et al.

All of the above patent applications and patents are incorporated herein, in their entirety, by the foregoing references thereto.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for incremental concurrent learning in automatic defect classification comprising the steps of:
   (a) providing defect images with truth labels;
   (b) performing a context sensitive segmentation to produce a segmented image output;
   (c) extracting a set of comprehensive features from a segmented image output to provide a feature output;
   (d) performing automatic feature selection and transformation of the feature output having an application feature set output;
   (e) automatic classification rule generation to provide classification rules for automatic feature selection and transformation and to provide initial classification rules;
   (f) providing new potential defects;
   (g) performing a context sensitive segmentation of the new potential defects;
   (h) performing feature extraction of potential defects to provide extracted potential defects;
   (i) performing feature classification of the extracted potential defects using the initial classification rules to provide defect classification;
   (j) providing potential defects and fabrication information;
   (k) providing a primary classification rule and secondary classification rule selection from a defect knowledge database from multiple products with different process cycles;
   (l) performing primary defect classification having a classification output;
   (m) checking a confidence of the classification output to decide whether to perform a secondary defect classification;
   (n) if the confidence is not high, performing a secondary defect classification;
   (o) checking the confidence of a secondary defect classification and if the confidence of the secondary defect classification is high, defining a classification outcome and providing the classification outcome to the primary classification rule and secondary classification rule selection step;
   (p) if the confidence of the secondary defect classification is not high, questioning the classification outcome and sending potential defects to a novelty defect detection step;
   (q) performing the novelty defect detection step to define artifacts or potential new defect types to provide information for a truth inquiry; and
   (r) performing a truth inquiry to update a classification rule database for use by the primary classification rule and secondary classification rule selection.

2. The method of claim 1 wherein the novelty defect detection step comprises:
   (a) providing potential novel defects;
   (b) performing artifact rejection of potential novel defects and generating an artifact database and potential novel defect database; and
   (c) performing a clustering of a potential novel defect database to provide defect clusters and other objects, and providing a truth determination of the defect clusters to update the potential novel defect database.

3. The method of claim 1 wherein the step of performing automatic classification rule generation comprises:
   (a) providing defect samples with truth labels where features are selected to form a feature space;
   (b) performing sample editing on the defect knowledge database to generate an edited result set;
   (c) performing a sample condensing on the edited result set to remove redundant samples;
   (d) performing adaptive learning on the feature space to identify a new prototype; and
   (e) generating high and low confidence thresholds for the new prototype with new classification rules.

4. The method of claim 1 wherein the step of performing a truth inquiry further comprises the steps of:
   (a) perform editing and condensing on a defect cluster to select a subset of defects; and
   (b) performing a similarity detection step to compare known defects to representative unknown defects.

5. The method of claim 1 wherein the defect knowledge database comprises a plurality of products wherein each product has a processing layer where each processing layer has a plurality of defect types wherein each defect type has a plurality of rules wherein each rule has a prototype.

6. The method of claim 1 wherein the defects are semiconductor wafer defects.

7. The method of claim 1 wherein the defects are liquid crystal display defects.

8. A method for incremental concurrent learning in automatic defect classification comprising the step of:
   (a) providing defect images with truth labels;
   (b) performing a context sensitive segmentation to produce a segmented image output;
   (c) extracting a set of comprehensive features from a segmented image output to provide a feature output;

(d) performing automatic feature selection and transformation of the feature output having an application feature set output;

(e) automatic classification rule generation to provide classification rules for automatic feature selection and transformation and to provide initial classification rules;

(f) providing new potential defects;

(g) performing a context sensitive segmentation of the new potential defects;

(h) performing feature extraction of potential defects;

(i) performing feature classification of the extracted potential defects using the initial classification rules to provide defect classification;

(j) providing potential defects and fabrication information;

(k) selecting a multiple stage classification rule from a defect knowledge database from multiple products with different process cycles;

(l) performing multiple stage classification having at least one classification result and at least one confidence;

(m) checking the at least one confidence and if the confidence is high, defining a classification outcome and providing the classification outcome to the multiple stage classification rule selection step;

(n) if the at least one confidence is not high, questioning the classification outcome and sending the potential defects to the novelty defect detection module;

(o) performing a novelty defect detection step to define artifacts or potential new defect types to provide information for a truth inquiry; and (p) performing the truth inquiry to update a classification rule database for use by the multiple stage classification rule selection.

9. The method of claim 8 wherein the novelty defect detection step comprises:

(a) providing potential novel defects;

(b) performing artifact rejection of potential novel defects and generating an artifact database and potential novel defect database; and (c) performing a clustering of a potential novel defect database to provide defect clusters and other objects, and providing a truth determination of the defect clusters to update the potential novel defect database.

10. The method of claim 8 wherein the step of performing automatic classification rule generation comprises:

(a) providing defect samples with truth labels where features are selected to form a feature space;

(b) performing sample editing on the defect knowledge database to generate an edited result set;

(c) performing a sample condensing on the edited result set to remove redundant samples;

(d) performing adaptive learning on the feature space to identify a new prototype; and (e) generating high and low confidence thresholds for the new prototype with new classification rules.

11. The method of claim 8 wherein the step of performing a truth inquiry further comprises the steps of:

(a) perform editing and condensing on a defect cluster to select a subset of defects; and (b) performing a similarity detection step to compare known defects to representative unknown defects.

12. The method of claim 8 wherein the defect knowledge database comprises a plurality of products wherein each product has a processing layer where each processing layer has a plurality of defect types wherein each defect type has a plurality of rules wherein each rule has a prototype.

13. The method of claim 8 wherein the defects are semiconductor wafer defects.

14. The method of claim 8 wherein the defects are liquid crystal display defects.

15. A method for incremental concurrent learning comprising the steps of:

(a) providing potential defects and fabrication information;

(b) providing a primary classification rule and secondary classification rule selection from a defect knowledge database from multiple products with different process cycles;

(c) performing a truth inquiry to update a classification rule database for use by the primary classification rule and secondary classification rule selection step;

(d) performing primary defect classification having a classification output;

(e) checking a confidence of the classification to decide whether to perform a secondary defect classification;

(f) checking the confidence of a secondary defect classification and if the confidence of the second defect classification is high, defining the classification outcome and providing the classification outcome to the primary classification rule and secondary classification rule selection step;

(g) if the confidence of the secondary defect classification is not high, questioning the classification outcome and sending the potential defects to a novelty defect detection step; and (h) performing the novelty defect detection step to define artifacts or a potential new defect type to provide information for the truth inquiry.

16. The method of claim 15 wherein the novelty detection step comprises:

(a) providing potential novel defects;

(b) performing artifact rejection of potential novel defects and generating an artifact database and potential novel defect database; and (c) performing a clustering of a potential novel defect database to provide defect clusters and other objects providing a truth determination of the defect clusters to update the potential novel defect database.

17. The method of claim 15 wherein the step of automatic classification rule generation further comprises the steps of:

(a) providing defect samples with truth labels where features are selected;

(b) performing a sample editing on the defect knowledge database;

(c) performing a condensing of an output of the sample editing;

(d) performing adaptive learning step for the initialization of prototypes;

(e) performing adaptive learning; and (f) generating high and low confidence thresholds for the classification rules to be generated.

18. The method of claim 15 wherein the step of performing a truth inquiry further comprises the steps of:

(a) editing and condensing a defect cluster; and (b) performing a similarity detection step to compare known defects to representative unknown defects.

19. The method of claim 15 wherein the defect knowledge database comprises a plurality of products wherein each product has a processing layer where each processing layer has a plurality of defect types wherein each defect type has a plurality of rules wherein each rule has a prototype.

20. The method of claim 15 wherein the defects are semiconductor wafer defects.

21. The method of claim 15 wherein the defects are liquid crystal display defects.

22. A method of incremental concurrent learning comprising the steps of:
   (a) providing potential defects and fabrication information;
   (b) providing a multiple classification rule selection from a defect knowledge database from multiple products with different process cycles;
   (c) performing a truth inquiry to update a classification rule database for use by the multiple classification rule selection;
   (d) performing multiple stage classification having at least one classification output and at least one confidence output;
   (e) checking the at least one confidence and if the confidence of the at least one classification is high, defining the classification outcome and providing the classification outcome to the multiple classification rule selection step;
   (f) if the at least one confidence is not high., questioning the classification outcome and sending the potential defects to the novelty defect detection module; and
   (g) performing a novelty defect detection step to define artifacts or potential new defect type to provide information for the truth inquiry.

23. The method of claim 22 wherein the novelty detection step comprises:
   (a) providing potential novel defects;
   (b) performing artifact rejection of potential novel defects and generating an artifact database and potential novel defect database; and
   (c) performing a clustering of a potential novel defect database to provide use of clusters and other objects providing a truth determination of the defect clusters to update the potential novel defect database.

24. The method apparatus of claim 22 wherein the automatic classification rule generation comprises:
   (a) providing defect samples with truth labels where features are selected;
   (b) performing a sample editing on the defect knowledge database;
   (c) performing a condensing of an output of the sample editing;
   (d) performing adaptive learning step for the initialization of prototypes; and
   (e) performing adaptive learning with a LVQ method;
   (f) generating high and low confidence thresholds for the rules to be generated.

25. The method of claim 22 wherein the step of performing a truth inquiry further comprises the steps of:
   (a) editing and condensing a defect cluster; and
   (b) performing a similarity detection step to compare known defects to representative unknown defects.

26. The method of claim 22 wherein the defect knowledge database comprises a plurality of products wherein each product has a processing layer where each processing layer has a plurality of defect types wherein each defect type has a plurality of rules wherein each rule has a prototype.

27. The method of claim 22 wherein the defects are semiconductor wafer defects.

28. The method of claim 22 wherein the defects are liquid crystal display defects.

29. A method of incremental concurrent learning comprising the steps of:
   (a) providing potential defects and fabrication information;
   (b) providing a classification rule selection from a defect knowledge database from multiple products with different process cycles;
   (c) performing a truth inquiry to update a classification rule database for use by the classification rule selection;
   (d) performing a single stage classification having at least one classification output and at least one confidence output;
   (e) checking the at least one confidence and if the confidence of the at least one classification is high, defining the classification outcome and providing the classification outcome to the classification rule selection step;
   (f) if the at least one confidence is not high, questioning the classification outcome and sending the potential defects to the novelty defect detection module; and
   (g) performing a novelty defect detection step to define artifacts or potential new defect type to provide information for the truth inquiry.

30. The method of claim 29 wherein the novelty detection step comprises:
   (a) providing potential novel defects;
   (b) performing artifact rejection of potential novel defects and generating an artifact database and potential novel defect database; and
   (c) performing a clustering of a potential novel defect database to provide use of clusters and other objects providing a truth determination of the defect clusters to update the potential novel defect database.

31. The method of claim 29 wherein the automatic classification rule generation comprises:
   (a) providing defect samples with truth labels where features are selected;
   (b) performing a sample editing on the defect knowledge database;
   (c) performing a condensing of an output of the sample editing;
   (d) performing adaptive learning step for the initialization of prototypes; and
   (e) performing adaptive learning with a LVQ method;
   (f) generating high and low confidence thresholds for the rules to be generated.

32. The method of claim 29 wherein the step of performing a truth inquiry further comprises the steps of:
   (a) editing and condensing a defect cluster; and
   (b) performing a similarity detection step to compare known defects to representative unknown defects.

33. The method of claim 29 wherein the defect knowledge database comprises a plurality of products wherein each product has a processing layer where each processing layer has a plurality of defect types wherein each defect type has a plurality of rules wherein each rule has a prototype.

34. The method of claim 29 wherein the defects are semiconductor wafer defects.

35. The method of claim 29 wherein the defects are liquid crystal display defects.

* * * * *